April 4, 1944.  I. H. KINNEBERG  2,345,753
CATALYTIC CONVERSION OF HYDROCARBON OILS
Filed Nov. 30, 1940
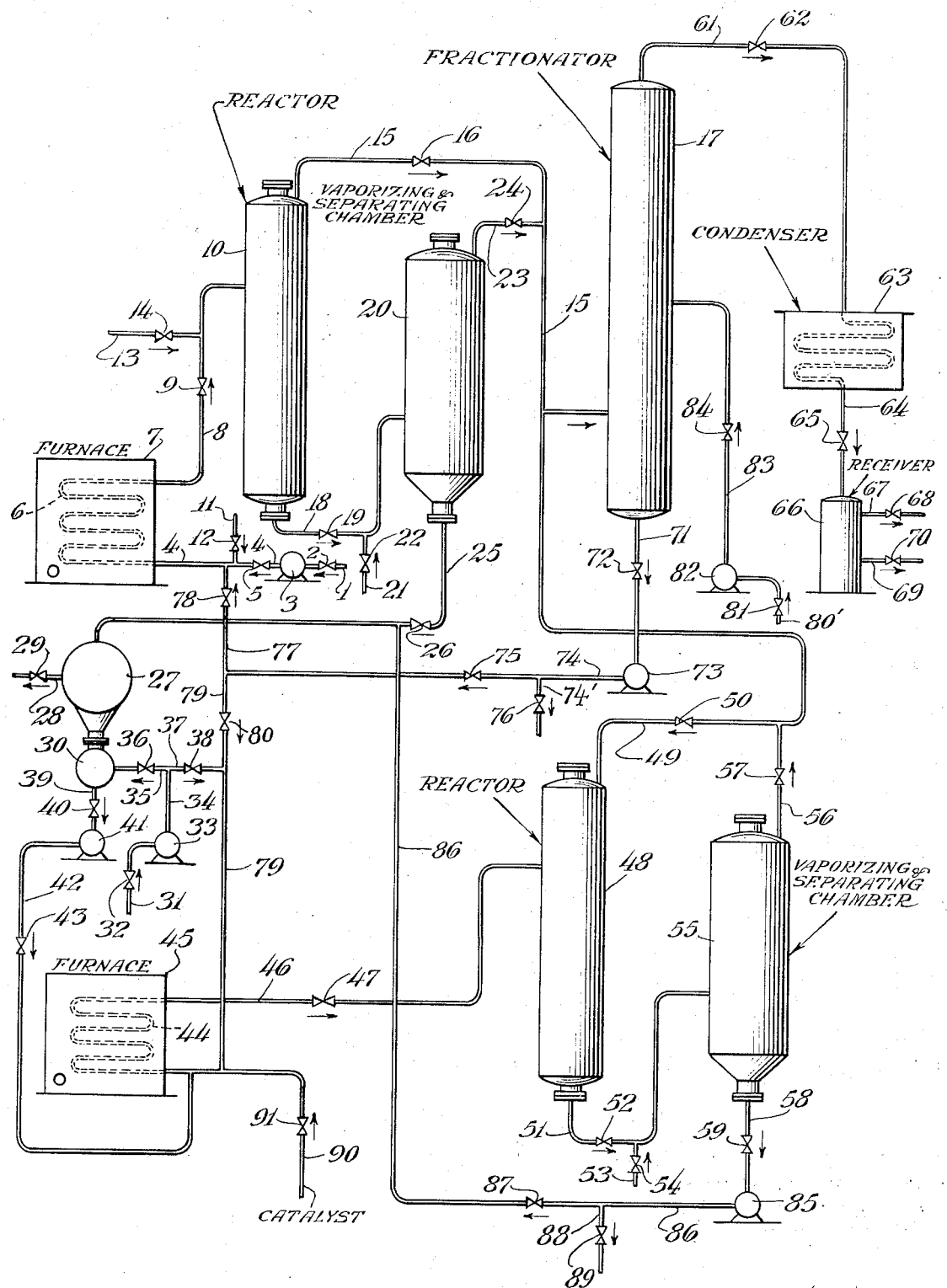

Patented Apr. 4, 1944

2,345,753

UNITED STATES PATENT OFFICE 2,345,753

CATALYTIC CONVERSION OF HYDROCARBON OILS

Ivar H. Kinneberg, Chicago, Ill., assignor to Universal Oil Products Company, Chicago, Ill., a corporation of Delaware Application November 30, 1940, Serial No. 367,969

2 Claims. (Cl. 196—52)

This invention relates to an improvement in a particular type of cracking operation wherein the catalytic agent employed to promote the cracking operation is admixed in powdered or finely divided state with the hydrocarbon oil undergoing cracking treatment.

Successful catalytic cracking operations have heretofore been conducted with the hydrocarbons in essentially vaporous state, the catalytic material comprising a stationary bed through which the hot oil vapors are passed and which requires frequent reactivation to restore the activity of the catalyst mass by burning deposited heavy carbonaceous materials therefrom in a stream of oxygen-containing gases. The attempts to employ powdered or finely divided catalytic material instead of fixed beds of granular catalyst have likewise been conducted with the oil predominantly in vaporous state in the reaction zone, the oil either alone or in admixture with the powdered catalyst being heated to a temperature at which the catalytic cracking operation will take place and at which the oil is substantially vaporized and then introduced into a reaction chamber wherein the oil is reacted in vaporized state in the presence of the catalyst, the latter being added to the stream of heated hydrocarbons prior to their introduction into said chamber, in case it is not included with the stream of oil undergoing heating. In the latter type of operation, the spent or partially spent catalyst powder is withdrawn from the reaction chamber with the heavy oil which remains unvaporized therein and its recovery from the residual oil is a difficult problem comparable in trouble and expense to that of frequent periodic reactivation of a bed of fixed granular catalyst.

The process of the present invention involves a radical departure from conventional practice in conducting the powdered catalyst type of cracking operation. In the improved process, fresh hydrocarbon oil cracking stock is heated to a temperature at which the desired catalytic cracking reaction will take place and resulting heated oil is introduced into an enlarged reaction zone wherein it is afforded sufficient time in contact with the catalyst employed to effect the desired cracking reaction. The finely divided catalytic material may be commingled with the oil either before or after the latter is heated or may be introduced, in part, before the heating step and, in part, into the stream of heated products passing from the heating step to the reaction zone. A sufficient superatmospheric pressure is employed in the reaction zone to maintain a major portion of the oil therein in liquid state and in admixture with the catalyst, while the light conversion products, including substantially all of those boiling within the range of the desired final distillate, are supplied as vapors from the reaction zone to a fractionating step. A substantial body of the commingled liquid oil and catalyst is maintained in the reaction zone and regulated quantities of the mixture are continuously supplied from the reaction zone to a reduced pressure vaporizing and separating chamber wherein a major portion of the liquid is vaporized by flash distillation, leaving a heavier residual liquid containing substantially all of the catalytic material. Vapors from the flash distilling zone are supplied to said fractionating step and the mixture of residual liquid and catalyst is separately withdrawn therefrom, the residual liquid separated, so far as conveniently possible, from the partially spent or partially contaminated catalyst and the latter supplied, together with additional quantities of the fresh charging oil, to a separate heating step. It is therein heated under independently controlled conditions to the desired cracking temperature and supplied to a separate reaction zone. Additional fresh catalyst may, when desired, be added to the stream either before or after the last-mentioned heating step. The last described reaction zone is operated like the first and the light vaporous conversion products are supplied therefrom to the fractionating step, while regulated quantities of the mixture of liquid oil and catalyst are supplied therefrom to another reduced pressure vaporizing and separating zone operated in a similar manner to that first described. A mixture of residual oil and catalyst from the last mentioned vaporizing and separating zone is removed, all or in part, from the system but regulated quantities thereof may, when desired, be returned to the aforementioned step wherein residual oil and catalyst from the first cracking operation are separated. Vapors from the last mentioned vaporizing and separating zone are supplied to the fractionating step and the total vaporous products supplied to the latter are therein fractionated to condense insufficiently converted components thereof as reflux condensate. Fractionated vapors of the desired end-boiling point are condensed to form the desired light distillate of the process. Reflux condensate formed in the fractionating step may be removed, all or in part, from the system as a separate product or as charging stock for a thermal cracking operation or it may be returned, all or in part, when desired, to either of the aforesaid heating steps for further cracking treatment within the system.

I have found that with the above described method of operation, by maintaining substantially liquid phase conditions in the reaction zones with subsequent flash distillation of the catalyst containing liquid under non-cracking conditions, the production of coke which tends to deposit on and foul the catalyst particles is substantially eliminated or at least materially retarded and subsequent separation of the spent catalyst from the residual oil is materially simplified. Apparently, in the improved operation provided by the invention, heavy conversion products which tend to collect on and foul the catalyst particles are of a soluble non-coke like nature and are at least partially removed from the catalyst particles by the solvent action of the fresh hydrocarbon oil and/or the reflux condensate supplied with the partially contaminated catalyst from the first cracking step to the second heating step and the thus restored catalytic material promotes cracking in the said second heating zone and the subsequent reaction zone. Furthermore, the spent or partially spent catalyst contained in the residual liquid removed from the second mentioned vaporizing and separating zone may be readily recovered for reactivation by diluting the catalyst containing residue with a suitable relatively light hydrocarbon oil, which acts as a solvent for much of the heavy materials deposited on the catalyst particles, and filtering the oil from the catalyst particles. The catalyst recovered in this manner is much more free of deleterious heavy conversion products than that recovered from the residual oil in a powdered catalyst type cracking operation operated in a conventional manner and is more quickly and readily restored to near its initial activity by burning the remainder deleterious deposits therefrom.

The accompanying drawing diagrammatically illustrates one specific form of apparatus in which the improved process provided by the invention may be conducted.

Referring to the drawing, charging oil is supplied from any desired source through line 1 and valve 2 to pump 3 by means of which it is fed through line 4 and valve 5 to heating coil 6 disposed in furnace 7. In coil 6 the oil is heated to the desired temperature for conducting the catalytic cracking reaction and directed therefrom through line 8 and valve 9 into reactor 10.

Any type of catalytic material capable of promoting the cracking reaction may be employed within the scope of the invention and it may be introduced in finely divided state, as a dry powder or as a slurry in oil, through line 11 and valve 12 into line 4 to commingle therein with the charging oil being supplied to coil 6, or the catalyst may be introduced, all or in part, through line 13 and valve 14 into line 8 to commingle therein with the stream of heated oil being supplied to reactor 10.

A sufficient superatmospheric pressure is maintained at the outlet of coil 6 and in reactor 10 to maintain a substantial quantity of the charging oil and resulting conversion products in liquid state in the reactor, in which liquid the finely divided catalyst remains suspended and promotes further conversion of the oil. The vapors supplied to and evolved in reactor 10 comprise substantially all of the conversion products boiling within the range of the desired light distillate product of the process and these vapors are directed from the upper portion of the reactor through line 15 and valve 16 to fractionator 17.

Liquid oil containing suspended catalyst is directed from the body thereof in reactor 10 through line 18 and valve 19 into vaporizing and separating chamber 20, which is preferably operated at a substantially reduced pressure relative to that employed in the reactor. The reduced pressure employed in chamber 20 serves to effect partial cooling of the oil supplied thereto and, preferably, the cooling is sufficient to prevent any substantial further cracking of the oil in chamber 20. When the reduction in pressure alone is not sufficient to accomplish this, additional cooling may be accomplished in any conventional manner, such as, for example, by introducing a suitable cooling oil through line 21 and valve 22 into line 18 to directly commingle therein with the stream of liquid oil and suspended catalyst passing therethrough to chamber 20. The temperature and pressure conditions employed in chamber 20 are correlated to effect substantial further vaporization of the liquid oil in this zone, leaving a relatively heavy residual liquid containing the suspended catalytic material and vaporizing from the mixture supplied to chamber 20 a major portion of its liquid components.

The vapors evolved in chamber 20 are directed therefrom through line 23, valve 24 and line 15 to fractionation in fractionator 17 and the residual liquid containing the suspended catalyst is separately directed from the lower portion of the chamber through line 25 and valve 26 to separating zone 27 wherein a substantial portion of the residual liquid is separated from the catalyst.

In the particular case here illustrated, the separating zone 27 comprises a filter which may be of the rotary or other continuous type, although any other type of separating equipment of conventional form may be employed within the scope of the invention. The residual liquid removed from the catalyst in filter 27 is withdrawn therefrom through line 28 and valve 29 to storage or elsewhere, as desired. The catalyst from which a substantial portion of the residual liquid has been removed is directed from the filter to a mixing chamber 30 and is therein mixed with charging oil to be cracked which may comprise regulated quantities of the same type of oil supplied to coil 6 or a different charging oil.

Provision is made, in the case here illustrated, for supplying charging oil through line 31 and valve 32 to pump 33 wherefrom it is fed through line 34 and thence directed, all or in part, through line 35 and valve 36 into chamber 30 in sufficient quantities to commingle therein with the catalyst supplied to this zone, as previously described, and form a pumpable fluid mixture. This mixture is directed from chamber 30 through line 39 and valve 40 to pump 41 by means of which it is fed through line 42 and valve 43 to heating coil 44. Additional quantities of charging oil from pump 33 may, when desired, be directed from line 34 through line 37, valve 38 and line 79 to heating coil 44. In addition to the catalyst supplied to coil 44 from chamber 30, additional fresh or reactivated catalyst may be supplied thereto either in relatively dry state or preferably as a slurry in oil through line 90 and valve 91 by well known means, not illustrated.

The mixture of oil and catalytic material supplied to coil 44 is heated during its passage therethrough to the desired catalytic cracking temperature by means of heat supplied from furnace 45, within which coil 44 is disposed, and the resulting heated materials are directed through line 46 and valve 47 into reactor 48 which is similar to reactor 10 and, like the latter, operated at a sufficiently high superatmospheric pressure to maintain a substantial portion of the oil supplied thereto in liquid state and at a sufficient temperature that substantial catalytic cracking of the liquid oil will occur in this zone in the presence of the catalytic material suspended therein.

When desired, in addition to the catalytic material supplied to coil 44 from chamber 30, regulated quantities of fresh or reactivated catalytic material may be supplied in finely divided state through line 90 and valve 91 into coil 44 and through the coil with the oil undergoing heating therein.

The vapors supplied to and evolved in reactor 48 which, like those from reactor 10, include substantially all of the conversion products formed therein which boil within the range of the desired final light distillate product, are directed from the upper portion of reactor 48 through line 49 and valve 50 to fractionator 17.

Liquid oil and suspended catalyst is withdrawn in regulated quantities from the body thereof in chamber 48 and directed from the lower portion of this zone through line 51 and valve 52 into another reduced pressure vaporizing and separating chamber 55 which is similar to and operated in much the same manner as chamber 20, to effect substantial vaporization of the liquid oil and leave a heavier residual liquid containing the suspended catalyst. Cooling may be accomplished, when desired, in line 51 by supplying regulated quantities of a suitable cooling oil thereto through lines 53 and valve 54. The vapors evolved in chamber 55 are directed from the upper portion thereof through line 56, valve 57 and line 49 to fractionation in fractionator 17.

The catalyst containing liquid residue which remains unvaporized in chamber 55 is directed from the lower portion of this zone through line 58 and valve 59 to pump 85 by means of which it is fed through line 86 and this material may, when desired, be returned, in part, through valve 87 in this line and through line 25 to separating zone 27. However, at least a portion of the catalyst containing residue from chamber 55 is removed from the system through line 88 and valve 89 communicating with line 86, preferably to suitable separating and catalyst regenerating equipment which is not a part of the present invention and is not here illustrated.

The vapors supplied to fractionator 17, as above described, are therein fractionated to form reflux condensate comprising their components boiling above the range of the desired final light distillate product. Fractionated vapors of the desired end-boiling point are directed from the upper portion of fractionator 17 through line 61 and valve 62 to condenser 63 wherefrom the resulting distillate and uncondensed gases are directed through line 64 and valve 65 to collection and separation in receiver 66. Uncondensed gases are released from the receiver through line 67 and valve 68 and distillate is removed from this zone through line 69 and valve 70 to storage or to any desired further treatment. When desired, regulated quantities of the distillate collected in receiver 66 may be returned therefrom by well known means, not illustrated, to the upper portion of fractionator 17 to serve as a cooling and refluxing medium in this zone.

The reflux condensate formed in fractionator 17 is directed from the lower portion thereof through line 71 and valve 72 to pump 73 and may be thence supplied, all or in part, through line 74, line 74' and valve 76 to storage or to any desired further treatment exterior to the system or it may be directed, all or in part, through valve 75 in line 74 and thence through line 77, valve 78 and line 4 to reheating in coil 6 and further catalytic cracking treatment in the succeeding reactor 10 or through line 79 and valve 80 to reheating in coil 44 and further cracking treatment in the succeeding reactor 48, or the reflux condensate may be supplied, in part, to coil 6 and, in part, to coil 44.

It is also within the scope of the invention to separate the reflux condensate by fractional condensation in fractionator 17 into two or more selected relatively low-boiling and relatively high-boiling fractions, either of which may be supplied, as desired, to either of the heating coils, while the other fraction is supplied to the other heating coil or removed from the system. This selective treatment of different fractions of the reflux condensate is now a well known part of the thermal cracking art and does not require illustration for an understanding of the application of this feature to the present process.

In case reflux condensate from fractionator 17 is subjected to further cracking treatment within the system, it is within the scope of the invention to supply regulated quantities of the raw oil charging stock for the process to fractionator 17 for preheating and fractionation therein in commingled state with the other material supplied to this zone. To accomplish this, provision is made, in the case here illustrated, for supplying charging oil through line 80' and valve 81 to pump 82 wherefrom it is fed through line 83 and valve 84 into fractionator 17 to directly commingle therein with the vapors undergoing fractionation in this zone and serve as a refluxing and cooling medium.

It should, of course, be understood that the invention is not limited to the use of apparatus of the specific form illustrated in the drawing nor is the process limited to two successive cracking stages. It is entirely within the scope of the broader concepts of the invention to employ any desired number of a plurality of catalytic cracking steps with the separation of partially spent catalyst from the residual liquids of the successive stages in the manner described and subsequent use of catalyst thus recovered, either alone or together with additional fresh catalyst, in a succeeding stage of the system, to promote the conversion of fresh charging oil or intermediate liquid conversion products from any or all of the various stages.

As an example of one specific operation of the process provided by the invention, as it may be conducted in an apparatus such as illustrated and above described: The charging stock is a gas oil fraction of approximately 35° A. P. I. gravity derived from mixed base crude. Approximately 50% of the charging oil employed and approximately 50% of the total reflux condensate from fractionator 17 are supplied to coil 6, the remaining 50% or thereabouts, of each of these materials being supplied to coil 44, together with the catalyst from separator 27. Approximately 80% of the fresh cracking catalyst is fed to coil 6 with the charging oil and reflux condensate supplied to this zone and the remaining 20%, or thereabouts, of the fresh catalyst employed is supplied with the remainder of the charging oil and reflux condensate and with the catalyst from separator 27 to coil 44.

Reactors 10 and 48 are each operated at an average temperature of approximately 800° F. and at a superatmospheric pressure of approximately 150 pounds per square inch. Chamber 20 is operated at a superatmospheric pressure of approximately 50 pounds per square inch and the temperature of the vapors leaving this zone is approximately 700° F. Chamber 55 is operated at a superatmospheric pressure of approximately 35 pounds per square inch and the temperature of the vapors leaving this zone is approximately 710° F. Fractionator 17 and the succeeding condensing and collecting equipment are operated at substantially the same pressure as that employed in chamber 55. Approximately 50% of the catalyst containing residual liquid withdrawn from chamber 55 is returned to separator 27 and the remainder is removed from the system to other separating and catalyst regenerating equipment.

In an operation such as above described, the yields which may be expected are approximately as follows: When the gasoline product collected in receiver 66 has an end-boiling point of approximately 400° F. it may amount to approximately 70% by volume of the gas oil charging stock and may have an octane number of approximately 76. The only other products of the process are a small quantity of residual liquid recovered from separator 27 and from the mixture withdrawn from chamber 55 and the gases recovered from receiver 66.

I claim as my invention:

1. The process which comprises, catalytically cracking a hydrocarbon oil in the presence of a fresh finely divided, catalytically active, solid contact material dispersed in the oil, separating from the cracked products a vaporous fraction containing the desired low-boiling product of the cracking operation and a residual liquid fraction containing contact material of reduced activity, separating the latter from at least a major portion of the residual hydrocarbons which do not adhere thereto, commingling the thus separated contact material with additional quantities of hydrocarbon oil to be catalytically cracked, to dilute and remove adhering heavy hydrocarbons from the contact material and disperse the latter in the oil, separately subjecting the resulting dispersion to catalytic cracking, separating from the products of the last named cracking operation, in a zone separate from that wherein said first named separation is effected, another vaporous fraction containing the desired low-boiling product of this cracking operation and another residual liquid fraction containing contact material of reduced activity, removing a regulated portion of the last-mentioned catalyst-containing residual liquid from the system and supplying another portion to the same separating step to which the first-mentioned catalyst-containing residual liquid is supplied, fractionating the first and second named vaporous fractions to condense therefrom as reflux condensate components boiling above the range of the desired distillate product, subjecting resulting fractionated vapors of the desired end-boiling point to condensation to form said distillate product and recovering the latter.

2. The process of catalytically cracking hydrocarbon oils which comprises, heating a hydrocarbon oil charging stock for the process to the desired temperature for conducting the cracking reaction, commingling regulated quantities of a fresh finely divided, catalytically active, solid contact material with the heated oil and effecting a cracking reaction promoted by said catalytic material in a reaction zone maintained at active cracking temperature and at superatmospheric pressure, removing resulting vaporous and liquid conversion products, the latter including said contact material, from the reaction zone and effecting appreciable further vaporization of the liquid products to form a catalyst-containing residual oil, fractionating the vapors, including those evolved by said further vaporization of the liquid conversion products, to form reflux condensate, subjecting resulting fractionated vapors of the desired end-boiling point to condensation, recovering the resulting distillate, removing said catalyst-containing residual oil from the zone of said separation and separating from the catalyst particles at least a major portion of the residual hydrocarbons which do not adhere thereto, commingling this recovered catalytic material of reduced activity with additional quantities of hydrocarbon oil to be catalytically cracked, to dilute and remove adhering heavy hydrocarbons from the catalyst particles and disperse the latter in the oil, separately heating the resulting dispersion to an active catalytic cracking temperature and effecting catalytic cracking of the oil in a separate reaction zone, separating from the resulting products another vaporous fraction and another catalyst-containing residual liquid, removing a regulated portion of the last-mentioned catalyst-containing residual liquid from the system and supplying another portion to the same separating step to which the first-mentioned catalyst-containing residual liquid is supplied, and supplying the last named vaporous fraction to the aforementioned fractionating step.

IVAR H. KINNEBERG.